Patented Aug. 14, 1928.

1,680,857

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

METHOD OF TREATING LATEX AND THE PRODUCTS OBTAINED THEREBY.

No Drawing. Application filed September 22, 1925, Serial No. 57,958. Renewed June 19, 1928.

This invention relates to improved methods for increasing the rate of deposition of rubber from latex upon a porous body by vulcanizing the latex, and to products obtained thereby.

The direct utilization of latex for the manufacture of articles of the kind prepared by dipping in or coating with latex is subject to one particular outstanding disadvantage, the slowness in the rate of deposit of the rubber and hence the inability to form articles of any appreciable thickness in a short time. The present invention aims to overcome this disadvantage by treating the latex in such a way that the rubber contained therein will be quickly and uniformly deposited upon a body or form which is pervious to the aqueous portion of the latex but adapted to restrain the rubber particles upon its surface.

Methods have been suggested for vulcanizing rubber in the form of latex, such vulcanization being carried out at temperatures ranging from ordinary atmospheric temperature to about 150° F. and up to 280° F. The methods heretofore known have relied entirely upon the use of an alkaline preservative, preferably ammonia, it being an essential to maintain a state of alkalinity in the latex throughout the vulcanizing operation and thereafter. According to the processes heretofore known, the vulcanized latex has had a tendency to undergo partial coagulation or else coalescence with a subsequent reduction of its period of utility. In either event the vulcanized latex cannot be regarded as stable. Furthermore, previous methods do not give a rapid vulcanization nor can they be readily carried out without some special apparatus. Such vulcanized latices also have a tendency to over-cure, which results in a decrease of the physical strength of rubber films and articles made from such vulcanized latex. Attempts to incorporate compounding ingredients with vulcanized latex have not been entirely successful for the reason that such ingredients tend to cause coagulation. None of the methods heretofore suggested can be carried out successfully with curing agents and accelerators of the non-nitrogenous carbon disulphide derivative type.

The primary object of the present invention is to increase the rate of deposition of the rubber on a porous body from uncoagulated latex. Another object of the invention is to provide a method for increasing this rate of deposition by vulcanizing the rubber in the form of latex. A further object is to increase the rate of deposition of rubber from latex by vulcanizing the latex in the presence of non-nitrogenous carbon disulphide accelerators. The invention also includes a method for controlling the increase in rate of deposition by controlling the extent of vulcanization. A still further object is to provide a vulcanized latex which will retain an approximately constant rate of deposition even after standing for relatively long periods of time. Still another object is to provide a method for vulcanizing rubber latex which is approximately free from ammonia. A further object is to vulcanize rubber in the form of latex at ordinary temperatures. A still further object is to provide a vulcanized latex with which compounding ingredients such as fillers, softeners, age retarders, etc. may be mixed at any time without causing coagulation. Another object is to provide a method for stabilizing rubber latex which may or may not have been specially treated or which has been freed of the majority of its non-rubber constituents. Another object is to provide a method for obtaining a hard rubber from vulcanized latex at approximately 212° F.

With the preferred embodiment in mind but not desiring to place undue limitations upon the scope of the invention beyond what may be required by the prior art, the invention briefly stated consists in freeing rubber latex from ammonia, mixing therewith oxy normal butyl thiocarbonic acid disulphide, dibenzylamine, zinc oxide, and sulphur in the form of emulsions, and allowing the latex to become vulcanized at ordinary temperatures, whereupon the rate of deposition of the rubber in the latex will have been greatly increased. The invention also includes accelerating the rate of vulcanization by heating the latex, and the invention further includes treating such vulcanized latex with more sulphur and an accelerator adapted to cause the rubber in the latex when deposited to vulcanize to hard rubber at say 212° F. Increasing the rate of deposit of the rubber from latex by vulcanizing the latex is within the scope of the invention.

The latex may be freed from ammonia by several different processes. The ammonia may be removed by heating ordinary ammonia preserved latex and blowing a current of air over its surface, or the heating step may not be employed. A more specific way of removing the ammonia is to treat the latex with an organic colloid or pectin body. According to this method a small amount of the organic colloid such as Irish moss, etc., is dissolved in water and purified if necessary, and then stirred into ordinary ammonia preserved latex. After standing for some time the rubber in the latex rises to the surface as an uncoagulated layer. The sub-natant layer contains a large portion of the ammonia together with other water soluble non-rubber constituents of latex and may be drawn off. This treatment may be repeated several times if desired. The same process may be carried out with pectin bodies instead of Irish moss.

The following is a specific example of the method of increasing the rate of deposition of the rubber in latex upon a porous body by vulcanizing the latex: 100 parts of rubber in the form of latex containing 35% of rubber, which latex has been twice creamed with pectin, is mixed with ½ part by weight of oxy normal butyl thiocarbonic acid disulphide in the form of an aqueous dispersion of its solution in solvent naphtha and ¼ part by weight of dibenzylamine in the form of an aqueous dispersion of its solvent naphtha solution, 2 parts by weight of zinc oxide, and two parts by weight of precipitated sulphur. The aqueous dispersions of oxy normal butyl thiocarbonic acid disulphide and of dibenzylamine are slowly stirred into the latex, and thereafter a thin cream of zinc oxide and sulphur is added. After standing for about two weeks at ordinary temperatures, say 70° F. the latex has become vulcanized.

The aqueous dispersion of the solvent naphtha solution of oxy normal butyl thiocarbonic acid disulphide is prepared as follows: 30 parts by weight of glue are dissolved in 90 parts by weight of water on a steam bath and after solution has been accomplished, ½ part by weight of sodium oleate is stirred into the glue solution by means of a high speed stirrer. To this glue solution is then added a solution of 30 grms. of oxy normal butyl thiocarbonic acid disulphide in 60 grms. of solvent naphtha, meanwhile stirring with a high speed stirrer until the emulsion has become stable. The dibenzylamine emulsion may be made in a similar manner.

The cream of zinc oxide and precipitated sulphur is made up by dissolving 1 part of glue in 1¼ parts of water and adding this solution to a thick mush of two parts of zinc oxide and 2 parts of sulphur in water. The mixture may then be run through a paint mill or may be ground to a smooth thin paste in a mortar.

If some of the vulcanized latex prepared according to the above example be poured upon a flat surface such as a glass plate and allowed to dry at ordinary temperatures, the translucent film of rubber obtained therefrom is not soluble in benzol, and exhibits a tensile strength of 2000 to 3800 pounds per square inch and a permanent set of approximately 0.3 inches. These properties indicate that the rubber has been vulcanized while in the form of latex. Furthermore this vulcanized latex has a high degree of stability towards chemicals and towards mechanical action, in fact the vulcanized latex prepared according to the above example is much more stable than latex which has been creamed with an organic colloid or a pectin body.

If a porous form be dipped in this vulcanized latex and subsequently dried it will be found that the layer of rubber clinging to the form is approximately twice as thick as that which would be obtained from a similar unvulcanized latex in the same length of time. Latex vulcanized according to the above example does not penetrate fabrics as rapidly as unvulcanized ammonia preserved latex. Films of rubber deposited from this vulcanized latex age quite well at 212° F. and the rubber may be soaked in water without impairing its tensile strength. If it be desired, 100 parts of a compounding ingredient, such as whiting, etc., or softening agents, or age retarders, may be added along with the curing ingredients or after vulcanization.

Latex which has been treated with pectin bodies or organic colloids usually contains about 0.25% of ammonia on the rubber. If the concentration of ammonia is as high as 0.6% on the rubber, coagulation may occur during vulcanization. The less ammonia within limits present in the latex during vulcanization the less is the danger of coagulation. The rate of vulcanization may be accelerated by increasing the amounts of curing ingredients, but over-vulcanization will take place more rapidly unless the percentage of sulphur is controlled. Smaller amounts may be employed, thereby decreasing the rate of vulcanization and also the chance of over-vulcanization. By limiting the amount of sulphur present in the latex the extent of cure may be controlled quite definitely, and the danger of over-vulcanization eliminated. The proportions specified in the examples do not permit sufficient over-vulcanization to cause a deterioration of the valuable properties of the compositions in less than a month. As the amounts of oxy normal butyl thiocarbonic acid disulphide or zinc oxide are decreased, the thickness of the film deposited on a porous form in unit time will be correspondingly decreased. Too much zinc oxide may cause coagulation.

Instead of employing latex which has been treated with pectin bodies, ordinary ammonia preserved latex may be used after removal of the ammonia, or after reduction of the ammonia to less than 0.2% on the rubber. Such ammonia freed latex may be preserved with trisodium phosphate.

Instead of allowing the latex and vulcanizing ingredients to stand for two weeks at 70°, the latex may be allowed to stand for say one week at 70°, and may then be heated for four hours at 150° F. It is preferable to allow the latex to stand for some time before heating, for if the latex be heated immediately after the addition of the curing ingredients, coagulation may occur.

As another example, ½ part of aniline may be substituted for the dibenzylamine in the above example and the oxy normal butyl thiocarbonic acid disulphide may be increased to 1 part, the other ingredients being the same. This example gives a latex which will vulcanize at ordinary temperatures in about ten days, and will yield a film of rubber which has a tensile strength of approximately 3000 pounds per square inch and a permanent set of 0.19 inches. This vulcanized latex may be heated for 24 hours at 150° F. without causing over-vulcanization and without impairing the physical strength of the rubber obtained therefrom. This mixture may also be allowed to stand for say nine days at 70° and then may be heated for sixteen hours at 150° F. whereupon vulcanization is complete. This vulcanized latex likewise deposits a film upon a porous form at approximately twice the rate of the unvulcanized latex. The thickness of the film deposited does not change appreciably as the vulcanized latex is allowed to stand. It is therefore apparent that the rate of deposit is approximately constant.

The above example, employing aniline instead of di-benzylamine may also be carried out with ordinary preserved latex from which the ammonia has been removed. The advantages of vulcanizing latex with oxy normal butyl thiocarbonic acid disulphide and aromatic amine such as aniline are that the latex does not over-vulcanize and that the rate of deposit of the rubber on a porous body is practically constant. There is also an advantage in heating the latex during the latter part of its vulcanization, for the increase in rate of deposit is thus largely completed during the heating step and remains practically constant after the latex has cooled down to ordinary temperatures.

Instead of oxy normal butyl thiocarbonic acid disulphide, any non-nitrogenous disulphides of the general formula

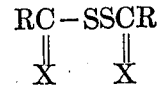

may be employed, preferably in the form of their aqueous dispersions. It is not essential in the invention to employ solvent naphtha as the solvent for the various materials, but other solvents or no solvent may be used. Where non-nitrogenous carbon disulphide derivatives are employed in the vulcanization of latex it is preferable that the latex be as free from ammonia as possible. During the vulcanization any amine may be employed or if it be desired no amine need be added. Salts of thiol acids of the general formula

may be employed instead of the disulphides. Metallic dithiobenzoates, such as the sodium or the zinc salts are examples. Xanthogenates such as zinc butylxanthogenate may be used. No amine need be added in this instance.

In order to prepare a vulcanized latex which will rapidly deposit a rubber adaptable to cure to hard rubber in the course of 24 hours at 212° F. the following mixture may be added to each 100 parts of any of the vulcanized latices prepared according to the above examples:—

25 parts of zinc oxide,
60 parts of sulphur, and
5 parts of tetramethylthiuramdisulphide.

This mixture may be added before or during vulcanization of the latex.

It may also be observed that oxy normal butyl thiocarbonic acid disulphide has a tendency to prevent putrefaction of the latex and at the same time acts as a preservative, especially for the pectin-treated latex.

Vulcanized latex prepared according to this invention may be employed in the manufacture of rubber articles by such processes as dipping porous forms in, or filling such forms with the vulcanized latex, or by electrodeposition, or by depositing the vulcanized latex upon a pervious web of associated fibres. As stated above, this vulcanized latex deposits a thick film of rubber in a short time and has the property of forming a layer on a pervious surface, such as a fabric rather than impregnating the fabric or soaking through it to any great extent. The manner of deposition of a layer of rubber upon or within a porous form or pervious web of fibres may be described as somewhat similar to that of filtration, but the invention is not limited to any particular manner of deposition, for the compositions lend themselves readily to electrodeposition. The compositions given above are particularly valuable because they are substantially permanent in rate of deposit, and because they are very stable towards chemicals and mechanical action. The compositions lend themselves readily to the manufacture of hose, tubular articles of all sorts, hot water bottles, and hollow articles of various kinds, irregularly shaped articles, sheets, strips, and threads, either of soft vulcanized rubber or hard rubber, and in numerous other applications. The terms "porous body" and "porous form" are used in the specification and claims to define a material or an association of materials, fibrous or granular or sponge-like, which permits the passage of water therethrough, but is impervious to the rubber particles of the treated latex.

While the invention is primarily concerned with the direct utilization of vulcanized natural latex in the formation of rubber articles such as those mentioned above, the invention also comprehends the use of artificially prepared latices which are susceptible of the same treatment with advantage in the deposit of the rubber therefrom on porous bodies or forms. The invention also comprehends vulcanizing the latex completely or partially in connection with the process recited in the claims. It is further understood that the treated latex described herein may be utilized in the manufacture of rubber articles in any manner to which it is adaptable, such as coating, dipping, or any of the other manufacturing methods utilized in connection with uncoagulated natural latex or artificial latices, and in its broadest aspects the invention comprehends such use of the uncoagulated material.

Having thus described my invention, what I claim and desire to protect by Letters Patent is:

1. A process for manufacturing rubber articles from latex which consists in vulcanizing the latex in the presence of a non-nitrogenous carbon disulphide accelerator, and depositing the rubber from the latex thus obtained directly on a porous form in the shape desired to make the article.

2. A process for manufacturing rubber articles from latex which consists in vulcanizing the latex in the presence of a non-nitrogenous carbon disulphide accelerator below approximately 212° F., and depositing the rubber from the latex thus obtained directly on a porous form in the shape desired to make the article.

3. A process for manufacturing rubber articles from latex which consists in vulcanizing the latex in the presence of a non-nitrogenous carbon disulphide accelerator and a metal in combination below approximately 212° F., and depositing the rubber from the latex thus obtained directly on a porous form in the shape desired to make the article.

4. A process for manufacturing rubber articles from latex which consists in vulcanizing the latex in the presence of a non-nitrogenous carbon disulphide accelerator and a metallic oxide below approximately 212° F., and depositing the rubber from the latex thus obtained directly on a porous form in the shape desired to make the article.

5. A process for manufacturing rubber articles from latex which consists in vulcanizing latex in the presence of a non-nitrogenous carbon disulphide accelerator and zinc oxide below approximately 212° F., and depositing the rubber from the latex thus obtained directly on a porous form in the shape desired to make the article.

6. A process for manufacturing rubber articles from latex which consists in vulcanizing latex in the presence of a non-nitrogenous carbon disulphide accelerator, an amine and zinc oxide below approximately 212° F., and depositing the rubber from the latex thus obtained directly on a porous form in the shape desired to make the article.

7. A process for manufacturing rubber articles from latex which consists in adding to rubber latex a non-nitrogenous carbon disulphide accelerator, an amine, a metallic oxide, and sulphur, and allowing said mixture to become vulcanized at temperatures below 212° F., and depositing the rubber from the latex thus obtained directly on a porous form in the shape desired to make the article.

8. A process for treating rubber latex which comprises adding to the latex rendered approximately free from ammonia a non-nitrogenous carbon disulphide accelerator, an amine, zinc oxide, and sulphur, and allowing said mixture to become vulcanized at temperatures below 212° F.

9. A process for treating rubber latex which comprises adding to the latex rendered approximately free from ammonia an accelerator of the type $$\underset{X\ \ X}{\text{RCSSCR,}}$$

an amine, zinc oxide, and sulphur, and allowing said mixture to become vulcanized at temperatures below 212° F.

10. A process for treating rubber latex which comprises adding to the latex rendered approximately free from ammonia an accelerator of the type RCSSCR, 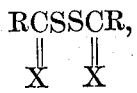

an amine, zinc oxide, and sulphur, allowing said mixture to become vulcanized at temperatures below 212° F., and recovering an uncoagulated vulcanized latex.

11. A process for treating rubber latex which comprises adding to the latex rendered approximately free from ammonia an accelerator of the type RCSSCR, 

an amine, zinc oxide, and sulphur, allowing said mixture to become vulcanized at temperatures below 212° F., and recovering an uncoagulated vulcanized latex of approximately constant degree of vulcanization.

12. A process for treating rubber latex which comprises adding to the latex rendered approximately free from ammonia an accelerator of the type RCSSCR, 

an amine, zinc oxide, and sulphur, allowing said mixture to become vulcanized at temperatures below 212° F., and recovering an uncoagulated vulcanized latex of approximately constant degree of vulcanization and rate of deposition.

13. A process for treating rubber latex which comprises adding to the latex rendered approximately free from ammonia oxy normal butyl thiocarbonic acid disulphide, an amine, zinc oxide, and sulphur, and allowing said mixture to become vulcanized at temperatures below 212° F.

14. A process for treating rubber latex which comprises adding to the latex rendered approximately free from ammonia oxy normal butyl thiocarbonic acid disulphide, an amine containing a benzene nucleus, zinc oxide, and sulphur, and allowing said mixture to become vulcanized at temperatures below 212° F.

15. A process for treating rubber latex which comprises adding to the latex rendered approximately free from ammonia oxy normal butyl thiocarbonic acid disulphide, dibenzylamine, zinc oxide, and sulphur, and allowing said mixture to become vulcanized at temperatures below 212° F.

16. A process for treating rubber latex which comprises mixing with a latex freed of approximately all of its ammonia by treatment with an organic colloid, mixing with said latex emulsions of oxy normal butyl thiocarbonic acid disulphide, dibenzylamine, zinc oxide, and sulphur causing vulcanization to take place at temperatures below 212° F.

17. A process for treating rubber latex which comprises mixing with a latex free of approximately all of its ammonia by treatment with an organic colloid, mixing with said latex emulsion of oxy normal butyl thiocarbonic acid disulphide, aniline, zinc oxide, and sulphur causing vulcanization to take place at temperatures below 212° F.

18. In a process for preparing a vulcanized latex, the step of adding to a latex containing ingredients adapted to vulcanize the rubber in said latex to a soft elastic product, sufficient additional sulphur, zinc oxide and a non-nitrogenous disulphide accelerator sufficient to cause the rubber derived from said vulcanized latex to vulcanize to hard rubber at approximately 212° F.

19. In a process for preparing a vulcanized latex, the step of adding to a latex containing ingredients adapted to vulcanize the rubber in said latex to a soft elastic product, sufficient additional sulphur, zinc oxide and tetramethylthiuramdisulphide to cause the rubber derived from said vulcanized latex to vulcanize to hard rubber at approximately 212° F.

20. In a process for preparing a vulcanized latex, the step of adding to an approximately ammonia-free latex containing sufficient non-nitrogenous carbon disulphide accelerator, zinc oxide, and sulphur to cause the rubber in said latex to become vulcanized to a soft elastic product, sufficient additional sulphur, zinc oxide and tetramethylthiuramdisulphide to cause said rubber to be vulcanizable to a hard rubber at temperatures below approximately 212° F.

21. In a process for preparing a vulcanized latex, the step of adding to an approximately ammonia free latex containing sufficient oxy normal butyl thiocarbonic acid disulphide, zinc oxide, and sulphur to cause the rubber in said latex to become vulcanized to a soft elastic product sufficient additional sulphur, zinc oxide and tetramethylthiuramdisulphide to cause said rubber to be vulcanizable to a hard rubber at temperatures below approximately 212° F.

22. As a new product, a vulcanized latex substantially free from an alkaline preservative.

23. As a new product, a vulcanized latex substantially free from ammonia.

24. As a new product, a vulcanized latex substantially free from ammonia, said vulcanized latex being approximately constant in rate of deposition of its rubber on a porous body.

25. As a new product, a vulcanized latex substantially free from ammonia, said vulcanized latex being approximately constant in rate of deposition of its rubber on a porous body and extent of vulcanization.

26. As a new product, a vulcanized latex substantially free from ammonia, said vulcanized latex being approximately constant in rate of deposition of its rubber on a porous body and extent of vulcanization, the rubber in said latex being vulcanizable to a hard rubber at temperatures below approximately 212° F.

Signed at New York, New York, this 9th day of September 1925.

SIDNEY M. CADWELL.